(No Model.)
H. G. PEARSON.
Electrical Conductor.
No. 231,085. Patented Aug. 10, 1880.
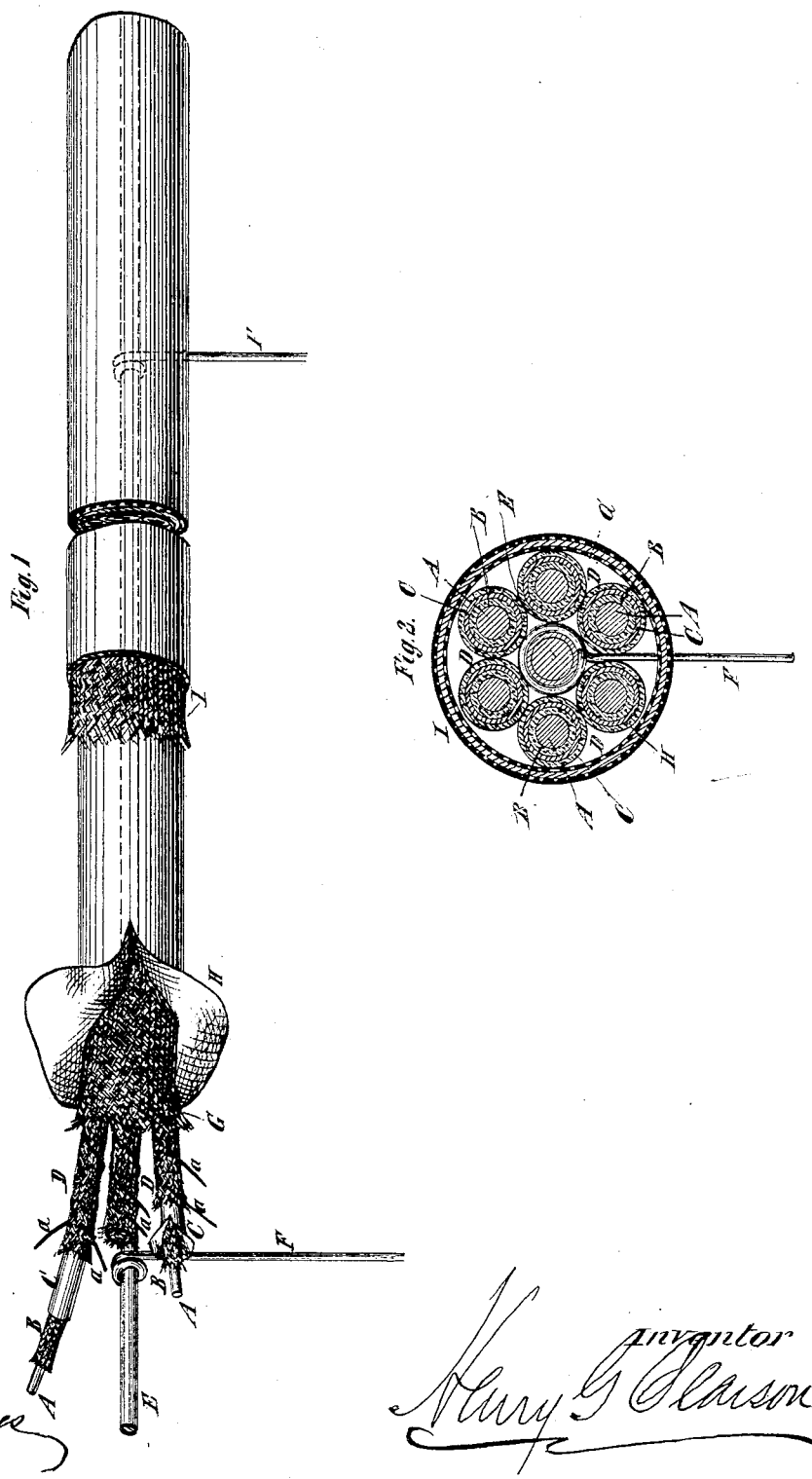
Witnesses
Edwin H. Brown
Fred. Haynes
Inventor
Henry G. Pearson

United States Patent Office.

HENRY G. PEARSON, OF NEW YORK, N. Y., ASSIGNOR TO THE CHINNOCK ELECTRIC COMPANY.

ELECTRICAL CONDUCTOR.

SPECIFICATION forming part of Letters Patent No. 231,085, dated August 10, 1880.

Application filed April 29, 1880. (No model.)

*To all whom it may concern:*

Be it known that I, HENRY G. PEARSON, of the city, county, and State of New York, have invented certain new and useful Improvements in Electrical Conductors, of which the following is a specification.

My invention relates to electric line-wires or conductors designed to obviate the detrimental effects of electrical induction, especially when arranged together in a cable.

The invention is particularly designed for line-wires or conductors provided with a covering of insulating material and an external casing of electric conducting material, such as tin or lead foil; and it is designed to afford a protection for such external electric casings without interfering with their communication through proper conductors with the earth for carrying off induced currents.

The invention consists in the combination of a line-wire or conductor, a covering of insulating material, an external casing of electric conducting material, and a surrounding braided or woven fabric of cotton, linen, or other like material, comprising a thread or threads of metal in electric communication with the external casings of electric conducting material, and exposed so that it or they may be put in electric communication through conductors or wires with the earth.

It also consists in the combination of a series of these lines-wires or conductors so provided with covering of insulating material with external casings of electric conducting material and with protecting fabrics of cotton, linen, or like material comprising metal threads, with a core-wire common to and in electrical communication with the said metal threads and through wires or conductors with the earth.

It also consists in the combination, with such line-wires and their appurtenances, of a protecting envelope and water-proof coating.

In the accompanying drawings, Figure 1 is a perspective view of a cable composed of a series of line-wires or conductors provided with coverings of insulating material, external casings of electric conducting material, and protecting fabrics comprising metal threads, with a surrounding envelope and water-proof coating according to my invention, showing the same severally partially stripped off; and Fig. 2 is a transverse section of the same.

A designates a series of metallic line-wires or conductors. B designates insulating coverings therefor, consisting, as here shown, of a woven fabric of cotton, linen, or other like material saturated with paraffine; and C designates external casings of electric conducting material, such as lead or tin foil.

D designates a woven or braided fabric of cotton, linen, or like material, surrounding and forming a protection for the external casing, C, of electric conducting material, and comprising one or more threads or strands of metal, *a*, incorporated into it preferably in the process of weaving or braiding. These threads or strands *a* are in contact and electrical communication with the external electric casings, and, as here shown, are in contact and electrical communication with corresponding threads or strands of adjacent line-wires or conductors A and with a central core-wire, E. This core-wire is shown as connected by wires F attached to it with the earth, in order that induced currents may be carried off, so as not to interfere with messages desired to be transmitted through the line-wires or conductors A.

G designates an envelope inclosing the entire series of line-wires or conductors A and their appurtenances above described, and composed of a woven or braided cotton, linen, or analogous fabric. By this envelope the additional protection is afforded and the line-wires or conductors are secured together. Outside this envelope I have shown a water-proof coating, which may consist of a shell or lamina of rubber cloth, H, and a shell or lamina, I, of woven or braided fabric of cotton, linen, or like material, saturated with paraffine and varnished with a material preferably insoluble in water.

It will be seen that I thus form a very cheap, durable, and otherwise desirable cable.

Single line-wires with the appurtenance above described and connected to the earth through the threads or strands *a* and wires F may be advantageous for some purposes.

It will we seen that by my invention I produce cheap, very simple, and durable electrical conductors for obviating induced currents, and applicable particularly to speaking telegraphs or telephones.

What I claim as my invention, and desire to secure by Letters Patent, is—

1. The combination of a line-wire or conductor, a covering of insulating material, an external electric casing of electric conducting material, and a surrounding braided or woven fabric of cotton, linen, or other like material, comprising a thread or threads of metal in electric communication with the external casings of electric conducting material, and exposed so that it or they may be put in electric communication through conductors or wires with the earth, substantially as specified.

2. The combination of a series of line-wires or conductors severally having coverings of insulating material, external casings of electric conducting material, and surrounding braided or woven fabrics, comprising a thread or threads of metal, with a core-wire common to and in electrical communication with all said metal threads and through wires or conductors with the earth, substantially as specified.

3. The combination, with line-wires or conductors severally having coverings of insulating material, external casings of electric conducting material, and surrounding protecting fabrics of cotton, linen, or like material comprising metal threads, of an envelope and water-proof coating.

HENRY G. PEARSON.

Witnesses:
FREDK. HAYNES,
EDWIN H. BROWN.